Aug. 1, 1939.   J. B. GRAHAM ET AL   2,167,887
PIPE ALIGNING CLAMP
Filed July 15, 1937   4 Sheets-Sheet 1

Inventors:
JAMES B. GRAHAM and
RAOUL G. MAYER.
by: *Usina & Rauber*
their Attorneys.

Aug. 1, 1939.                J. B. GRAHAM ET AL                2,167,887
                              PIPE ALIGNING CLAMP
                     Filed July 15, 1937        4 Sheets-Sheet 2
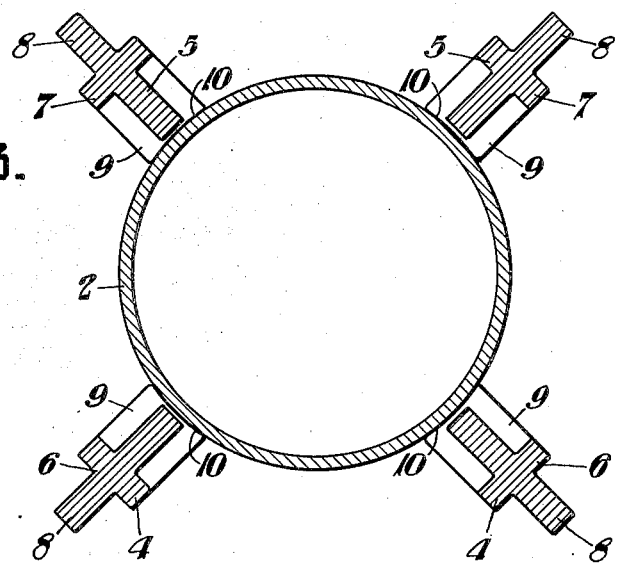
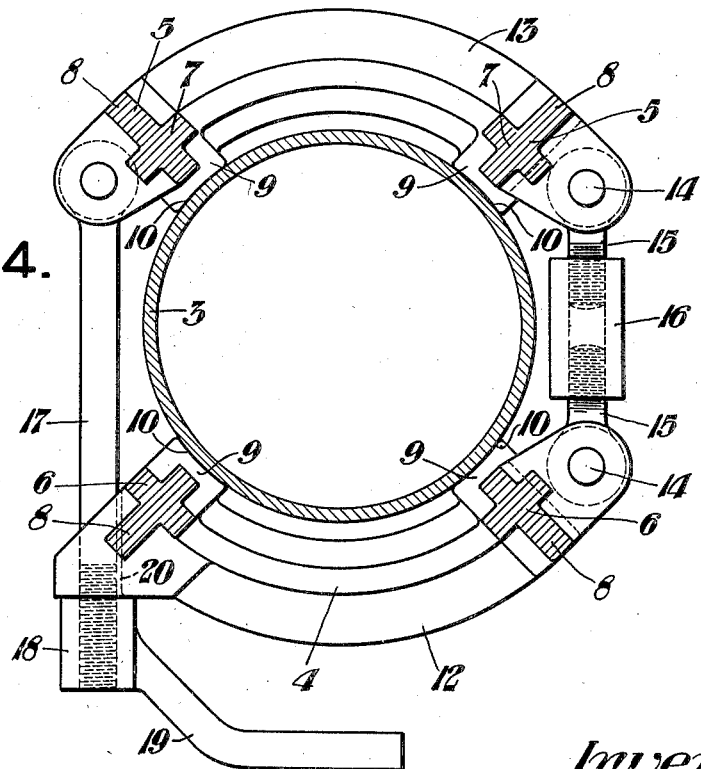
Inventors:
JAMES B. GRAHAM and
RAOUL G. MAYER.
by: Usina & Hauber
their Attorneys.

Aug. 1, 1939. J. B. GRAHAM ET AL 2,167,887
PIPE ALIGNING CLAMP
Filed July 15, 1937 4 Sheets-Sheet 3

Inventors:
JAMES B. GRAHAM and
RAOUL G. MAYER.
by: Usina & Rauber
Their Attorneys.

Aug. 1, 1939.  J. B. GRAHAM ET AL  2,167,887
PIPE ALIGNING CLAMP
Filed July 15, 1937  4 Sheets-Sheet 4
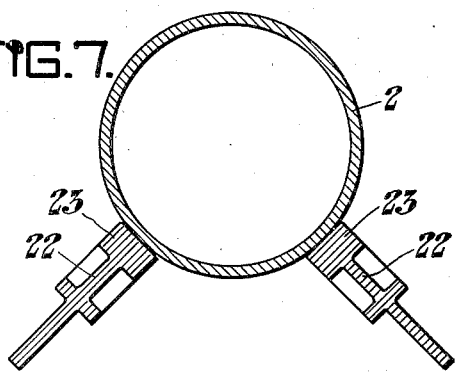
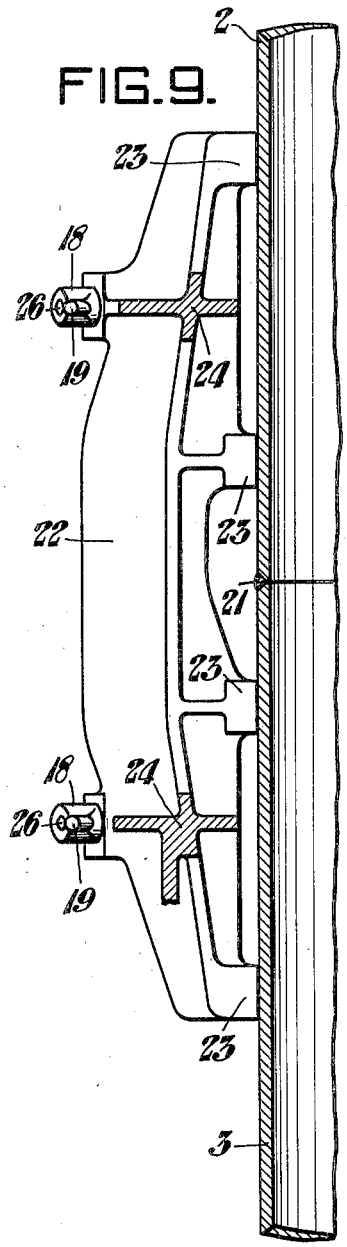
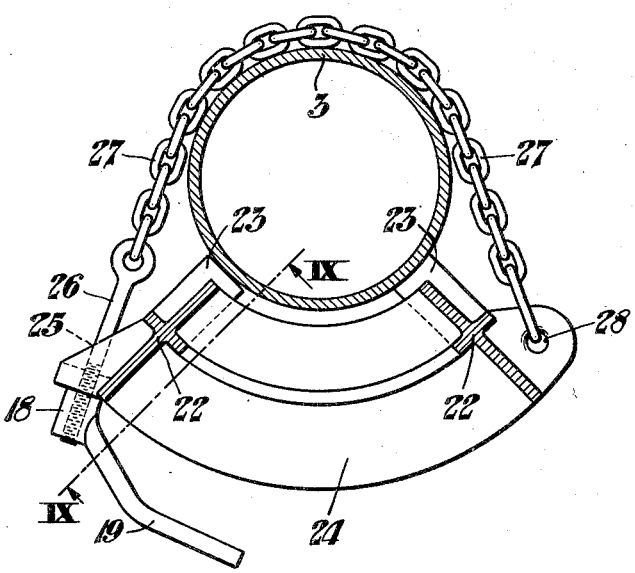
Inventors.
JAMES B. GRAHAM and
RAOUL G. MAYER.
by: Usina & Hauber
their Attorneys.

Patented Aug. 1, 1939

2,167,887

UNITED STATES PATENT OFFICE 2,167,887

PIPE ALIGNING CLAMP

James B. Graham, Mount Lebanon, and Raoul G. Mayer, Wilkinsburg, Pa., assignors to National Tube Company, a corporation of New Jersey Application July 15, 1937, Serial No. 153,865

1 Claim. (Cl. 113—102)

The present invention relates to an apparatus for clamping together adjoining sections of pipe in longitudinal alignment and retaining them in aligned position during the operation of welding the joint.

An object of this invention is to provide an apparatus for use around the outside of the pipe sections so as to rigidly retain the abutting ends aligned during the welding operation.

Other objects and advantages will become apparent as the description proceeds, in which:

Figure 3 is a section on the line III—III of Figure 1;

Figure 4 is a section on the line IV—IV of Figure 1;

Figure 7 is a section on the line VII—VII of Figure 6;

Figure 8 is a section on the line VIII—VIII of Figure 6; and

Figure 9 is a detailed sectional view through the clamp and showing the pipe sections in aligned position.

Figure 1:
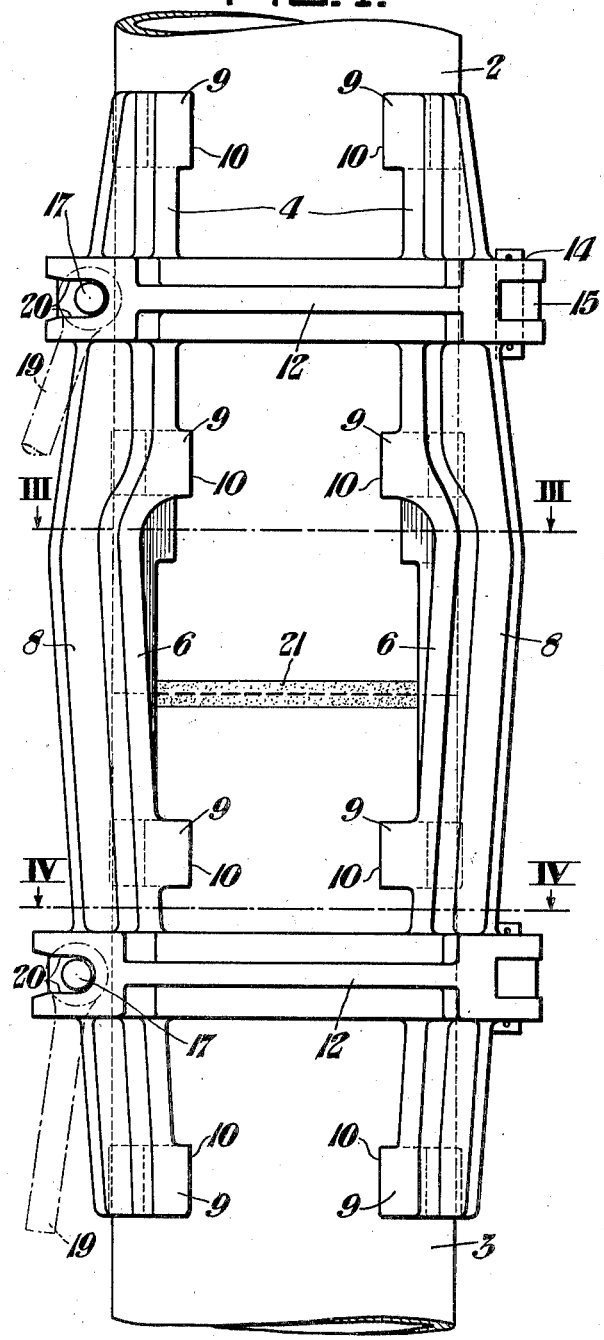
Figure 1 is an elevational view of the apparatus applied to adjoining pipe sections.

In the drawings, the numerals 2 and 3 represent sections of pipe to be aligned by the present apparatus, whereby said abutting ends are held in rigid alignment during the operation of welding the joint.

Figure 2:
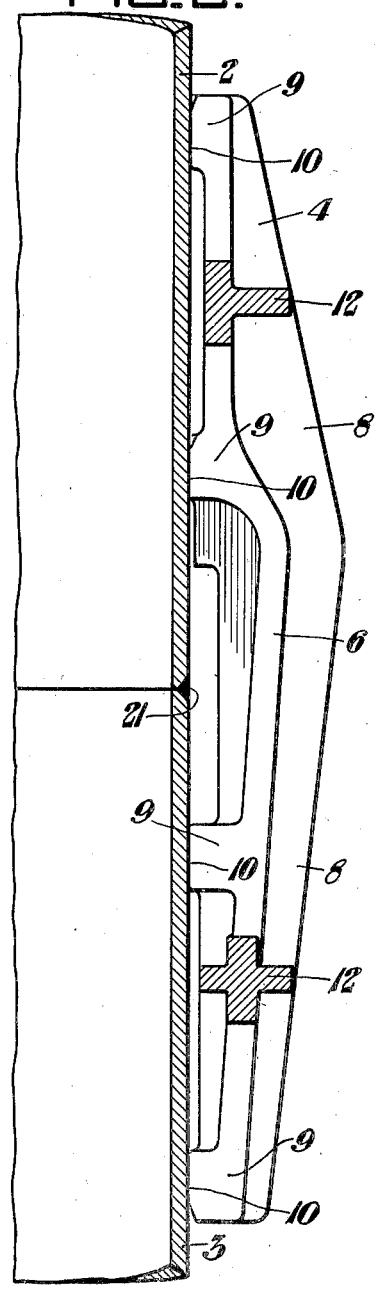
Figure 2 is a detailed sectional elevation through one of the clamps of the present invention.

The apparatus for clamping and aligning said pipe sections comprises cradles 4 and 5, as shown in Figures 1 to 4, inclusive. These cradles are of skeleton construction, each cradle comprising spaced members 6 and 7 provided with reenforcing ribs 8 and having inwardly extending lugs 9. These lugs 9 are positioned in the same vertical plane on each side of the frame and on a horizontal quadrant which is of a diameter that will permit the contoured faces 10 of said lugs to contact the pipe sections 2 and 3 on which they are to be positioned.

Integral cross-members 12 and 13 connect the top and bottom portions of said spaced members 6 and 7. Pivotally secured at 14 to one end of said cross-bars 12 and 13 are threaded bolts 15. The threaded ends of said bolts 15 are connected to a turnbuckle 16 which makes it possible to adjust said cradles to accommodate pipes of varying diameter and insure contact of the lugs with said pipe sections.

Pivotally secured to the other end of the cross-members 13 is an eye-bolt 17 provided with a threaded end adapted to receive the nut 18 having a handle extension 19. This bolt 17 is adapted to be positioned in a slot 20 formed in the cross-members 12.

In this form of construction, the cradles being pivotally connected through the bolts 15 and turnbuckle 16, are encircled around the pipe sections, so that the inwardly projecting lugs 9 engage the circumference of each pipe section and thereby bring the abutting pipe ends into proper alignment with each other. Upon securing the bolt 17 within the slot 20 of the cross-members 12 and turning the handle on the nut 18, the two cradles force the abutting ends of the pipe sections into alignment and rigidly hold them in such position during the operation of welding the joint, indicated at 21.

Figure 5:
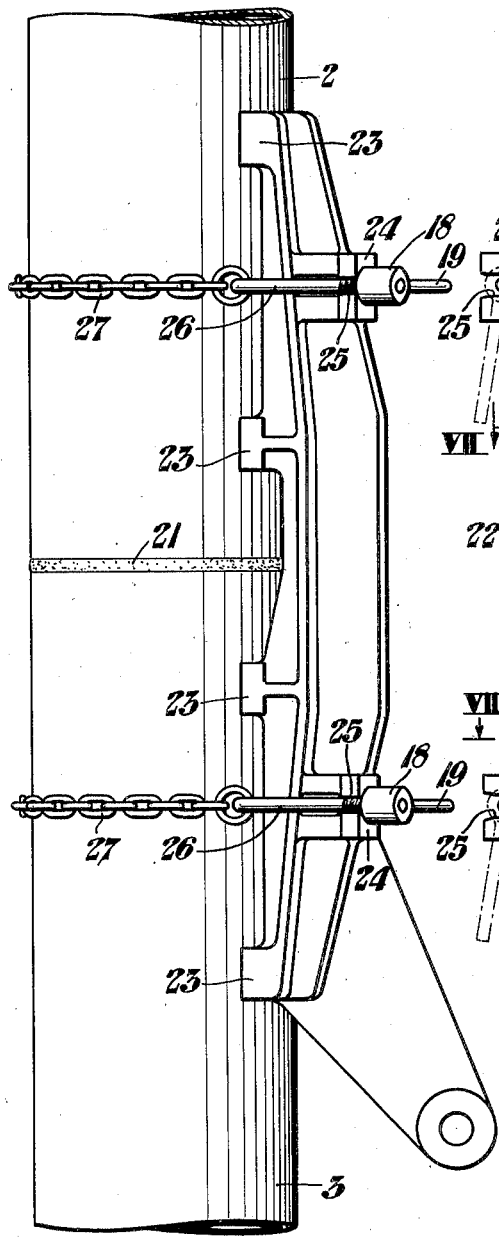
Figure 5 is an elevational view of a modified form of the present invention, showing the use of a single cradle connected to a flexible member.
Figure 6:
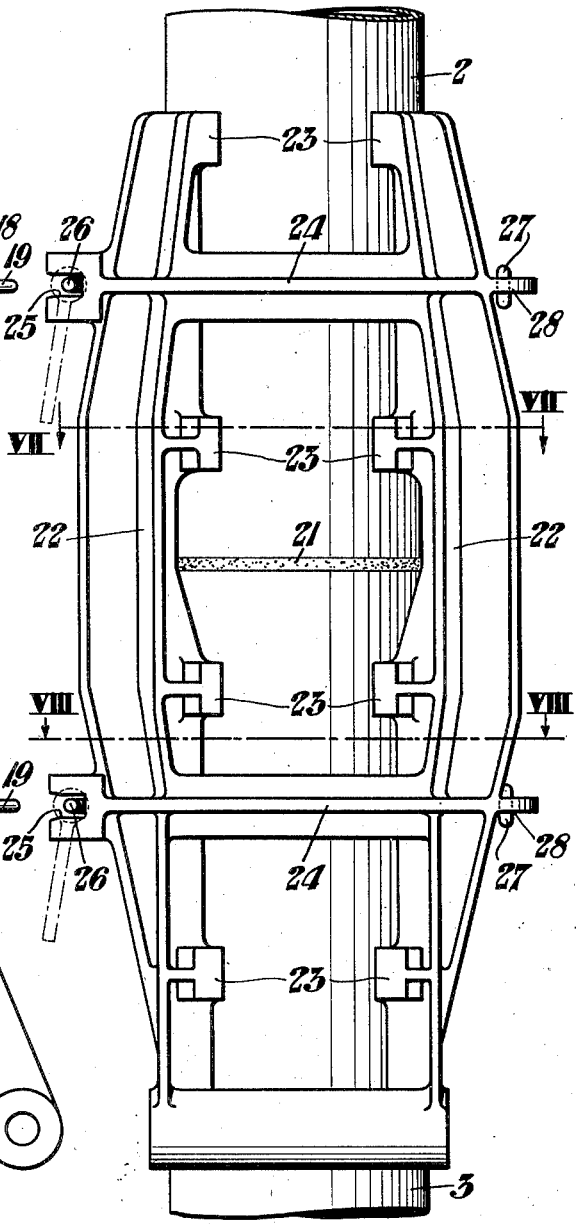
Figure 6 is an elevational view showing the cradle construction applied to adjacent pipe sections.

In the form shown in Figures 5 to 9, inclusive, the apparatus for clamping and aligning the pipe sections comprises a cradle including spaced reenforced channel members 22 having inwardly extending lugs 23 positioned in the same vertical plane and on each side of the frame. Cross-members 24 are positioned adjacent the ends of the members 22. These cross-members extend inwardly and are constructed and arranged to provide an arcuate portion for surface contact with the circumference of the pipe over substantially a quarter thereof. One end of the cross-members 24 is provided with a slot 25 to receive the threaded bolt 26 mounted on the flexible member 27, the other end of which is connected at 28 to the cross-members 24. A nut 18, similar in construction to that shown in Figure 4, is positioned on the threaded end of the bolt 26 to securely hold the cradle and flexible member about the pipe sections.

Under the constructions of the present invention, it becomes apparent that there is provided a clamping and aligning device capable of rigidly holding adjoining sections of pipe in aligned position during the operation of welding the joint which is shown at 21 in the respective figures.

While we have shown and described specific embodiments of the present invention, it will be seen that we do not wish to be limited exactly thereto, since various modifications may be made without departing from the scope of the invention, as defined by the following claim.

We claim:

A clamp for aligning adjoining sections of pipe on a common longitudinal axis comprising cradles, said cradles each including spaced members extending longitudinally of the axis of the pipe sections and having reenforcing ribs formed on one side and inwardly extending spaced lugs on the other side thereof, said lugs of each cradle lying in the same vertical plane and being so arranged as to contact said pipe sections at quadrants around the periphery thereof at points adjacent the point of welding of the pipe sections and at points above and below said first mentioned points of contact, integrally former cross-members for the spaced members of each cradle, means pivotally connected to the cross-members of said cradles for adjustably positioning said cradles on said pipe sections and means on the other ends of said cross-members for clamping and releasing said cradles upon said pipe sections.

JAMES B. GRAHAM.
RAOUL G. MAYER.